United States Patent [19]

Mori et al.

[11] Patent Number: 5,084,113
[45] Date of Patent: Jan. 28, 1992

[54] METHOD OF PRODUCING A BUILDUP VALVE FOR USE IN INTERNAL COMBUSTION ENGINES

[75] Inventors: Kazuhiro Mori; Soya Takagi, both of Toyota, Japan

[73] Assignee: Toyota Jidosha Kabushiki Kaisha, Toyota, Japan

[21] Appl. No.: 485,813

[22] Filed: Feb. 26, 1990

Related U.S. Application Data

[63] Continuation of Ser. No. 368,946, Jun. 14, 1989, abandoned, which is a continuation of Ser. No. 185,368, Apr. 21, 1988, abandoned, which is a continuation of Ser. No. 866,295, May 23, 1986, abandoned.

[30] Foreign Application Priority Data

May 24, 1985 [JP] Japan .................. 112671

[51] Int. Cl.$^5$ .................. C21D 6/02; C21D 9/00; F01L 3/04
[52] U.S. Cl. .................. 148/127; 148/903; 29/888.46; 29/888.45; 123/188 AA
[58] Field of Search .................. 123/188 AA; 428/679; 148/903; 29/157.1 R, 157.1 A, 888.44, 88.45, 888.46; 251/368; 219/121.63, 121.64, 121.65, 121.66

[56] References Cited

U.S. PATENT DOCUMENTS

| | | | |
|---|---|---|---|
| 2,664,874 | 1/1954 | Graham | 29/888.46 |
| 3,349,463 | 10/1967 | Kittelson | 29/888.46 |
| 3,649,380 | 3/1972 | Tauschek | 123/188 AA |
| 3,952,180 | 4/1976 | Gnanamuthu | 219/121 LM |
| 4,015,100 | 3/1977 | Gnanamuthu et al. | 148/903 |
| 4,179,316 | 12/1979 | Connors et al. | 148/152 |
| 4,182,299 | 1/1980 | Earle et al. | 123/188 AA |
| 4,232,094 | 11/1980 | Rhodes et al. | 148/903 |
| 4,447,275 | 5/1984 | Hiraoka et al. | 148/903 |
| 4,513,977 | 4/1985 | Umeha et al. | 148/1 |
| 4,532,191 | 7/1985 | Humphries et al. | 428/679 |
| 4,708,752 | 11/1987 | Kar | 148/903 |
| 4,781,770 | 11/1988 | Kar | 148/903 |
| 4,787,736 | 11/1988 | Mori et al. | 29/888.45 |
| 4,834,036 | 5/1989 | Nishiyama et al. | 123/188 AA |

OTHER PUBLICATIONS

"Laser Right on the Beam for Heat Treating Duty", Iron Age, Feb. 10, 1975, pp. 45-47, 29/888.44.
Fiorietta, Carl, "Electron Beam Heat Treating", Metals Handbook, 9th ed., vol. 4, American Society for Metals, 1981, pp. 518-521.
Sandven, Ole, "Laser Surface Transformation Hardening", Metals Handbook, 9th ed., vol. 4, American Society for Metals, pp. 507-521.
Ayers, J. D., "Appendix Hardening of Metal Surfaces by Laser Processing", Metals Handbook, 9th ed., vol. 6, American Society for Metals, pp. 793-803.

*Primary Examiner*—John J. Zimmerman
*Attorney, Agent, or Firm*—Oblon, Spivak, McClelland, Maier & Neustadt

[57] ABSTRACT

A buildup valve comprising a valve body of a quench-hardenable, heat resistant steel having a valve face and a buildup layer formed on the valve face from a cobalt or nickel base superalloy having higher wear and heat resistances than the heat resistant steel is useful in internal combustion engines. A hardened layer is formed in the valve face portion adjacent the buildup layer and has a maximum thickness between 0.05 mm and 2.0 mm. The buildup layer thus has a reduced thickness between 0.1 mm and 0.5 mm. The buildup valve is produced by supplying and depositing a powder of the alloy on the valve face, and applying a scanning high flux energy laser or plasma beam to the powder deposit to cause the powder to quickly melt and then quickly solidify thereby forming the buildup layer and at the same time, to cause a surface layer of the valve body underlying the powder deposit to quickly heat and then quickly cool thereby forming the hardened layer.

3 Claims, 6 Drawing Sheets

● : MELT DOWN
▽ : TEMPERED (OVERHEAT)
○ : ACCEPTABLE
△ : SHORTAGE OF HEAT AMOUNT
× : LITTLE OR NO BUILDUP

METHOD OF PRODUCING A BUILDUP VALVE FOR USE IN INTERNAL COMBUSTION ENGINES

This application is a continuation of application Ser. No. 07/368,946, filed on June 14, 1989, which was a continuation of applicaiton Ser. No. 07/185,368, filed on Apr. 21, 1988, which was a continuation of application Ser. No. 06/866,295 field on May 23, 1986, all now abandoned.

BACKGROUND OF THE INVENTION

This invention relates to buildup valves for use in internal combustion engines suitable for automobiles and the like.

Engine valves used in automotive engines including intake and exhaust valves are valves that control the intake of an air-fuel mixture and the discharge of spent gas in the combustion chamber. Each engine valve includes a valve head and a valve stem extending therefrom. The head of an engine valve is located within the combustion chamber. Cycles of tight engagement and separation are repeated between a valve seat snugly fitted in a cylinder head and the valve face. The valve face is required to be resistant to heat, corrosion, and wear because it is exposed to elevated temperatures of 700° C. to 800° C. in the combustion chamber and subjected to repetitive collision against the valve seat.

One prior art method for imparting heat resistance and other desired properties to the valve face of engine valves is by building up materials having excellent heat, corrosion, and wear resistances, for example, cobalt or nickel base superalloys on the valve face. Gas buildup techniques using acetylene gas are now prevalent for the building up of such materials on the valve face although TIG welding and plasma spraying may also be used.

Most these conventional engine valves have a buildup of at least 1 mm thick on the valve face for the following reasons. It is technically difficult to control the thickness of a buildup to a lower level by the acetylene gas buildup and TIG buildup techniques. The matrix material must be preheated before the deposition of a buildup material by the acetylene gas buildup and TIG buildup techniques. The preheating causes part of the matrix iron to melt so that iron is introduced into the buildup layer to dilute the buildup material, resulting in promoted deterioration of the buildup layer. In order to secure a sound buildup layer of a certain thickness, the initial buildup must be 1 mm or thicker.

The buildup materials are very expensive and cost, for example, 8,000 to 10,000 yen/kg. Because of the thickness and expensiveness of buildup material, the cost of buildup material occupies about 30 to 40% of the total cost of valve. An attempt was made to reduce the valve cost by reducing the thickness of buildup. In the conventional acetylene gas buildup and TIG buildup techniques, however, the overall valve face is hardened and thus become brittle during deposition of buildup material, which in turn, requires tempering. Therefore, simply reducing the thickness diminishes the resistance to deformation. In case of high performance, high power engines whose valve face is exposed to a high pressure, the valves themselves undergo considerable deformation and are thus unacceptable.

SUMMARY OF THE INVENTION

Therefore, an object of the present invention is to provide a novel and improved buildup valve for use in internal combustion engines having on its valve face a buildup layer whose thickness is reduced without reducing the deformation resistance of the valve face.

Another object of the present invention is to provide a buildup valve having a thin buildup layer on its valve face whereby the amount of expensive buildup material is reduced to achieve a cost saving.

A further object of the present inventin is to eliminate the tempering step which is required after deposition of buildup material in the prior art, thereby simplifying the process for producing buildup valves.

The present invention is thus directed to a buildup valve for use in internal combustion engines comprising a valve body of a quench-hardenable, heat-resistant steel having a valve face and a buildup layer formed on the valve face from an alloy having higher wear and heat resistances than the heat resistant steel. According to the feature of the present invention, the buildup layer has a thickness in the range between 0.1 mm and 0.5 mm, the valve body further includes a hardened layer formed therein adjacent the inside surface of the buildup layer, and the hardened layer has a maximum thickness in the range between 0.05 mm and 2.0 mm.

Preferably, the valve body is formed of a martensitic, quench-hardenable, heat-resistant steel. The hardened layer has a martensite structure, a hardness in the range between 500 and 600 in Vickers hardness, and a maximum thickness in the range between 0.1 mm and 1.5 mm. The buildup layer is formed of superalloys such as cobalt base superalloys and nickel base superalloys.

According to a second aspect of the present invention, there is provided a method for producing a buildup valve as defined above, comprising the steps of
supplying a powder of the alloy on the valve face of the valve body, and
applying a scanning high flux energy, typically a laser or plasma beam, to the powder deposit to cause the powder to quickly melt and then quickly solidify thereby forming a buildup layer and at the same time, to cause a surface region of the valve body underlying the powder deposit to quickly heat and then quickly cool thereby forming a hardened layer. The energy density of said high flux energy laser beam or plasma should be controlled, preferably in the range between 30 J/mm² and 110 J/mm² such that the hardened layer has a maximum thickness in the range between 0.05 mm and 2.0 mm and the buildup layer has a thickness in the range between 0.1 mm and 0.5 mm.

BRIEF DESCRIPTION OF THE DRAWINGS

The above and other objects, features, and advantages of the invention will become more apparent in the detailed description, taken in conjunction with the accompanying drawings, in which.

DETAILED DESCRIPTION OF THE INVENTION

Figure 1:
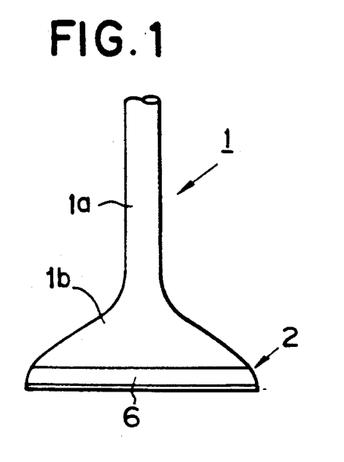
FIG. 1 is an elevation of a typical buildup valve for use in internal combustion engines to which the invention is applicable.
Figure 2:
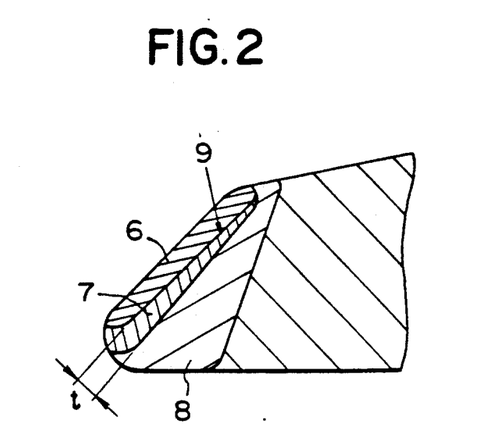
FIG. 2 is an enlarged cross-sectional view of a buildup portion of a buildup valve according to one embodiment of the present invention.

Referring to FIG. 1, there is illustrated a typical buildup or clad valve to which the present invention is applicable. FIG. 2 illustrates in enlarged cross section a peripheral portion of a valve head where a buildup layer is provided.

A valve body denoted at 1 consists of a valve stem 1a valve head 1b flaring from one end of the stem. The valve head 1b has a valve face 2 circumferentially extending on the flare outer surface of the head. The valve face 2 is a region that comes in sealing engagement with a valve seat in an internal combustion engine (not shown). More specifically, the valve face 2 is provided with a recess 9 in which a buildup or cladding layer 6 is formed. A surface region of the valve body that defines the recess 9 and thus adjoins the buildup layer 6 is a hardened layer 7. An inside region of the valve body that adjoins the hardened layer 7 is a heat affected region 8. All these layers or regions 6, 7, and 8 extend throughout the circumference of the valve face 2.

The valve body 1 is formed of quench-hardenable, heat-resistant steel. The valve body material may be selected from well-known quench-hardenable, heat-resistant steels commonly used in internal combustion engine valves, for example, martensitic heat-resistant steels. Typical martensitic heat-resistant steels which can be used herein have a composition comprising 5 to 22% by weight Cr and 0.3 to 1.0% C as base components and one or more alloying elements selected from 0.5 to 1.5% Mo, 0.5 to 2% Ni, 0.5 to 1.5% W, 0.2 to 1.0% Mn, 0.2 to 0.5% V, and 0.5 to 4.0% Si, balance being iron.

The buildup layer 6 is formed of an alloy having higher heat and wear resistances than the heat resistant steel of the valve body 1. Typical of the buildup alloy materials are cobalt base superalloys and nickel base superalloys. The cobalt base superalloys are well known alloys which were developed from Stellite and which mainly depend on the solid solution strengthening due to addition of molybdenum (Mo) and tungsten (W) and the dispersion strengthening due to chromium (Cr) carbide. Examples of the cobalt base superalloys used herein include (a) compositions consisting essentially of, on a weight basis, 2.5% C, 1.1% Si, 1.5% Ni, 30.0% Cr, 0.6% Mo, 4-12.0% W, less than 1.5% Fe, and balance Co, and (b) compositions consisting essentially of 0.25% C, 1.1% Si, 22.0% Ni, 26.0% Cr, 0.2% B, less than 1.5% Fe, and balance Co. All percents used throughout the specification are percents by weight unless otherwise stated.

The nickel base superalloys are precipitation hardening alloys comprising approximately 20% of chromium (Cr) and having aluminum (Al), titanium (Ti), and niobium (Nb) added for the purpose of high-temperature strength. Examples of the nickel base superalloys used herein include (c) compositions consisting essentially of, on a weight basis, less than 1.5% Co, 14-23% Cr, 5-16% Mo, less than 4.0% W, less than 5.0% Fe, less than 0.8% Si, less than 1.0% Mn, 0.05-0.1% C. 0.1-2.0% Ca and balance Ni and (d) compositions consisting essentially of less than 5.0% Co, 18-22% Cr, 3-6% Mo, less than 4.0% Fe, less than 1.0% Si, less than 1.0% Mn, 0.05-0.1% C, 0.1-2.0% Ca, less than 1.0% Al, and balance Ni.

The buildup valve for internal combustion engines according to the present invention has the hardened layer 7 which is located in the face portion of the valve head adjacent the buildup layer 6 as best shown in FIG. 2 and has a maximum thickness t in the range between 0.05 mm and 2.0 mm. The hardened layer 7 is as hard as a Vickers hardness (Hv) of 500 to 600 and has a martensite composition. The hardened layer 7 serves as a backup for the buildup layer. The maximum thickness t of the hardened layer is limited to the range of from 0.05 to 2.0 mm because sufficient deformation resistance is not achieved with a thickness of less than 0.05 mm. If the hardened layer maximum thickness exceeds 2.0 mm, the valve body itself detracts from toughness and is liable to troubles like cracking and chipping, and it would encounter such troubles as bowing during hardening. The maximum thickness of the hardened layer preferably falls in the range between 0.1 mm and 1.5 mm.

The backup by the hardened layer permits the thickness of the buildup layer to be reduced to ½ to 1/10 of that required for conventional buildups. Although the conventional buildup layers are as thick as 1 mm or more, the present invention succeeds in reducing the buildup layer thickness to 0.1 mm to 0.5 mm.

By the term maximum thickness is meant that the hardened layer 7 increases its thickness from the top to the bottom as best shown in FIG. 2 and reaches the maximum thickness t. This is because the region of the valve body that is heated to the hardening temperature varies its thickness in a flaring or width direction even when a high flux energy laser or plasma having a constant irradiating energy density is used in fusing a buildup material as will be described later. As understood from FIG. 2 or FIGS. 5 to 7, the region of the valve body that is heated to the heardening temperature increases its thickness in a flaring or width direction and is thickest in proximity to the tip (bottom as viewed in the figures) of the valve face. The object of the present invention can be attained as long as the thickest section of the hardened layer has a thickness falling in the range of 0.05 mm to 2.0 mm, although the remaiders of the hardened layer are more or less thinner than the defined thickness range. However, it is ideally desired that the average thickness of the hardened layer (which corresponds to the thickness of the hardened layer at the center in a width direction in a substantial sense) fall in the range of 0.05 mm to 2.0 mm.

The buildup valve of the invention is prepared by building up or depositing a powder buildup material on the valve face of the valve body. A high flux energy beam in the form of a laser or plasma beam is used to melt the powder deposit. By irradiating and scanning the powder buildup material deposit with the high flux energy beam, successive spots of the powder buildup material deposit are instantaneously heated and melted and immediately thereafter cooled and solidified as the scanning beam is continuously moved from spot to spot. At the same time, the matrix material or heat resistant steel of the valve body underlying the buildup material deposit is also heated. As the energy beam is moved away, the matrix material once heated is rapidly cooled, that is, hardened by martensitic transformation. Because of the use of a scanning high flux energy laser or plasma beam, the heating time is so short that only a shallow region of the valve body is heated with the irradiation energy beam. Consequently, the resulting hardened layer is thin enough to fall in the above-defined thickness range of 0.05 mm to 2.0 mm.

The internal combustion engine buildup valve of the present invention having a hardened layer of the abovedefined thickness created under the buildup layer can afford a deformation resistance comparable to that obtained by conventional thick buildup layers although the thickness of the present buildup layer is reduced to about ½ to 1/10 of that of the conventional ones. The present invention thus offer a saving in the cost of buildup material corresponding to a reduction in buildup layer thickness.

Since the hardened layer is sufficiently thin, the formation of the hardened layer brings little deformation in the overall valve structure. The valve as hardened is thus ready for actual use.

EXAMPLES

Figure 3:
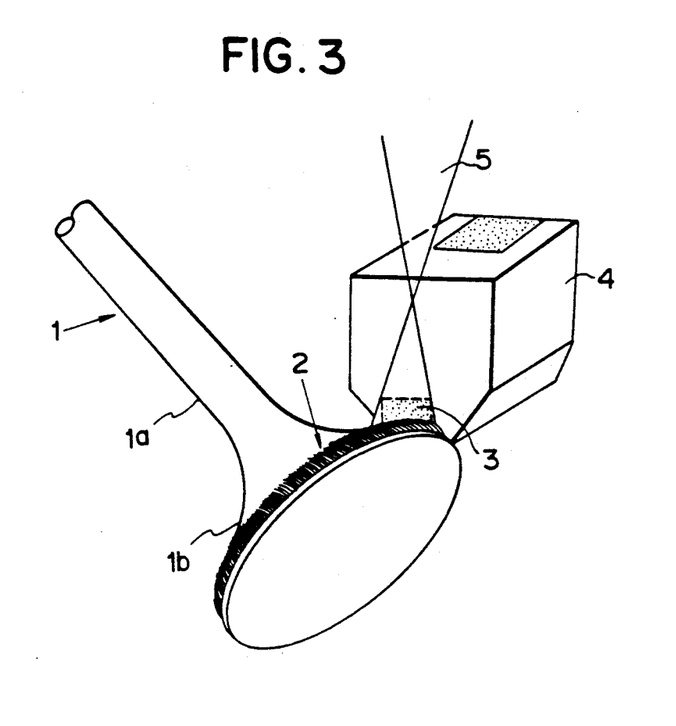
FIG. 3 is a schematic view showing the production of a buildup valve according to the present method.

An intake valve of martensitic heat resistant steel (SUH 3B) is prepared which has an overall length of 94 mm, a head diameter of 28 mm, and a stem diameter of 6 mm. As shown in FIGS. 2 and 3, the intake valve 1 consists of a stem 1a and a head 1b having a valve face 2 which is provided with a recess 9 for accommodating a buildup. The intake valve 1 is placed with its stem slanted such that an upward portion of the valve face 2 extends substantially horizontally. The stem 1a at the other end (not shown) is held for rotation about its axis. Disposed immediately above the upward portion of the valve face 2 is hopper means 4 for supplying and depositing a buildup alloy powder onto the valve face. A shielding gas is also supplied to the upward portion of the valve face 2 from a suitable shielding gas supply (not shown). A laser beam 5 is directed from a laser emission unit (not shown) to the upward portion of the valve face 2.

The buildup alloy powder 3 used is Stellite No. 6 having a composition of 1.0% C, 1.2% Si, less than 3.0% Ni, 28.0% Cr, 4% W, less than 3.0% Fe, and balance Co.

The building up process is illustrated below. The hopper means 4 supplies the buildup alloy powder 3 into the recess 9 in the valve face 2. As the intake valve 1 is rotated at a predetermined circumferential speed, the buildup alloy powder 3 is continuously deposited along the valve face 2. At the same time, the laser beam 5 is applied to the powder deposit on the upward portion of the valve face 2 while nitrogen gas as the shielding gas is fed there from the shielding gas supply. The laser beam is dimensioned to have a cross section of 4.8 mm by 2.3 mm.

Figure 4:
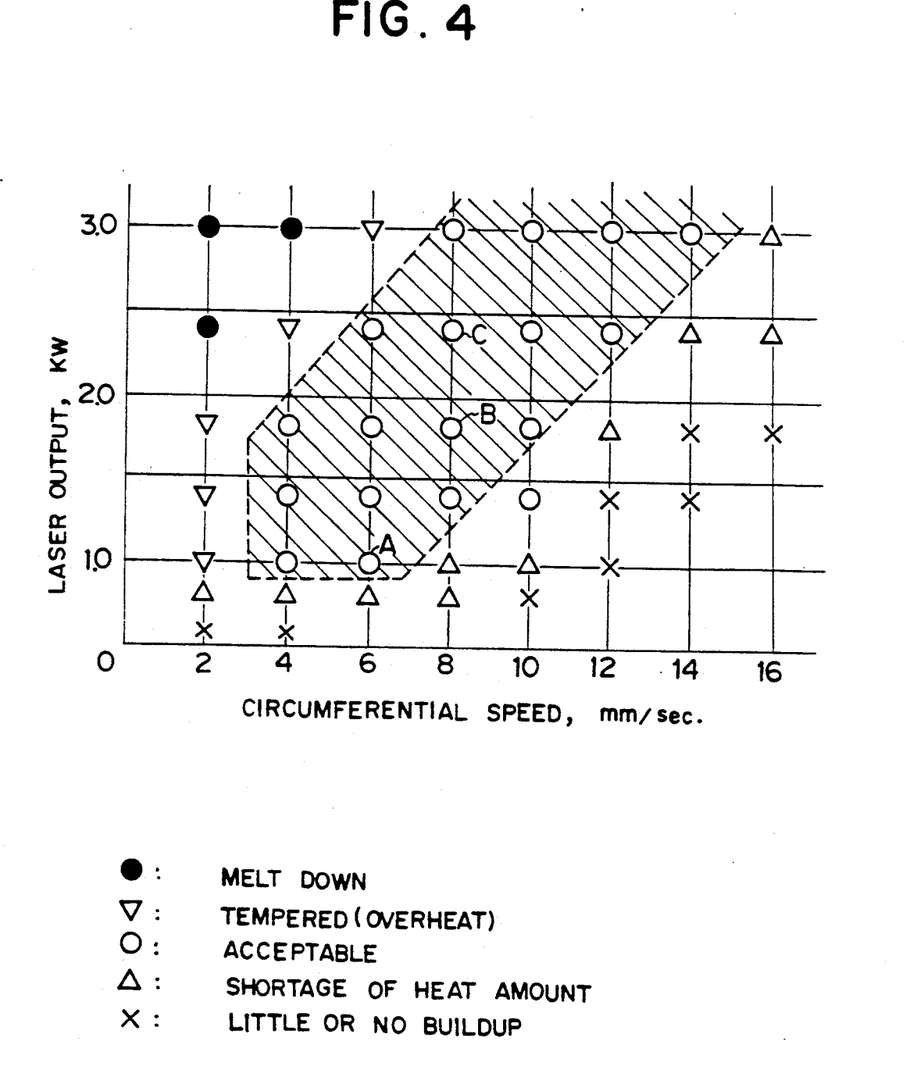
FIG. 4 is a graph showing optimum conditions for forming a hardened layer in a buildup valve wherein the state of the hardened layer is plotted in relation to circumferential speed and laser output.

A number of building up runs were carried out in this way while the circumferential speed of the rotating intake valve 1 was varied in the range from 2 mm/sec. to 16 mm/sec. and the laser power was varied in the range from 0.2 kilowatts to 3.0 kilowatts. The results are plotted in FIG. 4 wherein the abscissa represents the circumferential speed in mm/sec. of the rotating valve and the ordinate represents the power of a laser beam in kilowatt. In FIG. 4, symbol blank circle "○" represents that hardened layers of 0.1 mm to 2.0 mm thick are formed, inked circle "●" represents that the inside of the buildup layer is melted down, inverted triangle "∇" represents that the once hardened layer is tempered due to overheating, triangle "Δ" represents that the heat amount is too short to form any hardened layer, and crisscross "X" represents that the heat amount is extremely too short to form any buildup. A hatched area in FIG. 4 thus represents a region available as hardened layer forming conditions.

Figure 5:
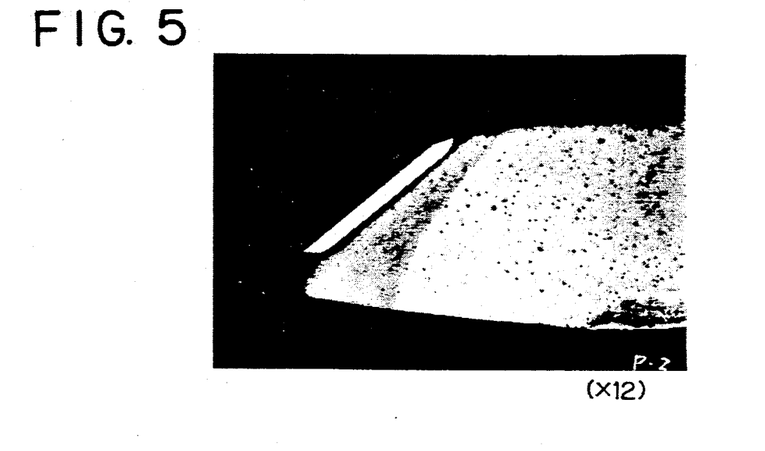
FIGS. 5, 6, and 7 are photographs (12×) showing the metal structure in cross section of different buildup valves produced under varying hardening conditions.
Figure 6:
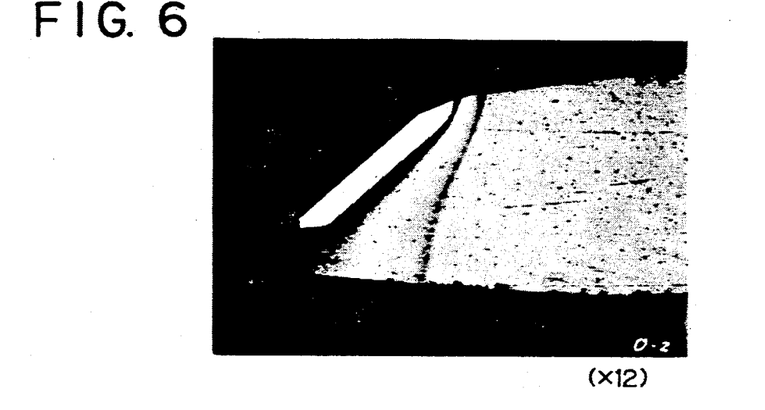
Figure 7:
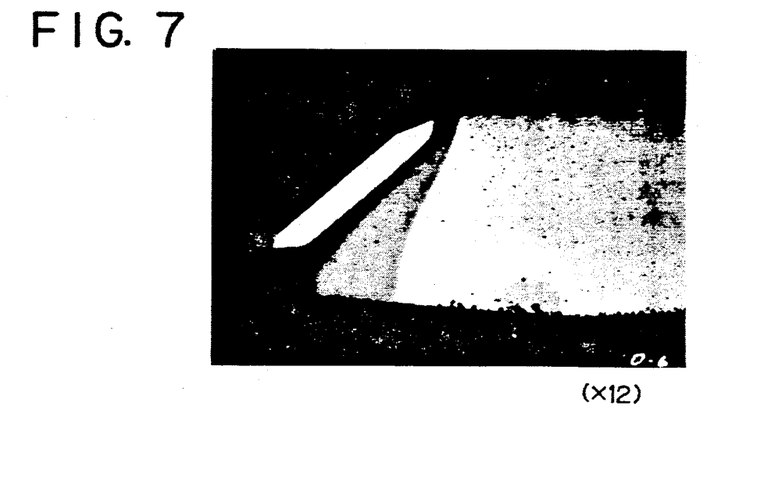
Figure 8:
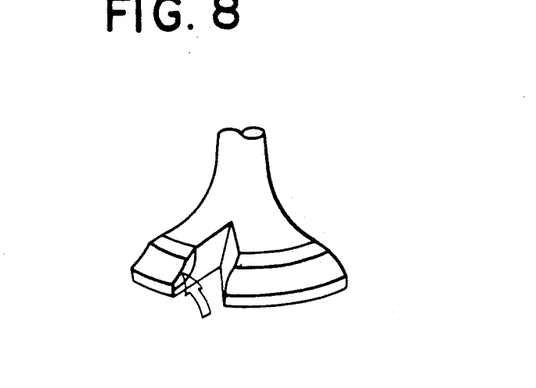
FIG. 8 is a partially broken away view of a head of a buildup valve.

FIGS. 5, 6, and 7 are photographs (magnification 12×) showing the metal structure of various buildup valves produced under conditions designated at A, B, and C in FIG. 4, respectively. It is readily understood that FIGS. 5, 6, and 7 are views of a buildup valve of FIG. 8 taken in the arrowed direction. As seen from FIGS. 5, 6, and 7, the hardened layer had a maximum thickness of 0.07 mm and the buildup layer had a thickness of 0.2 mm under condition A (circumferential speed 6 mm/sec. and laser output 1.0 kW). Likewise, the hardened layer had a maximum thickness of 0.3 mm and the buildup layer had a thickness of 0.33 mm under condition B (circumferential speed 8 mm/sec. and laser output 1.8 kW). The hardened layer had a maximum thickness of 0.33 mm and the buildup layer had a thickness of 0.4 mm under condition C (circumferential speed 8 mm/sec. and laser output 2.4 kW).

Figure 9:
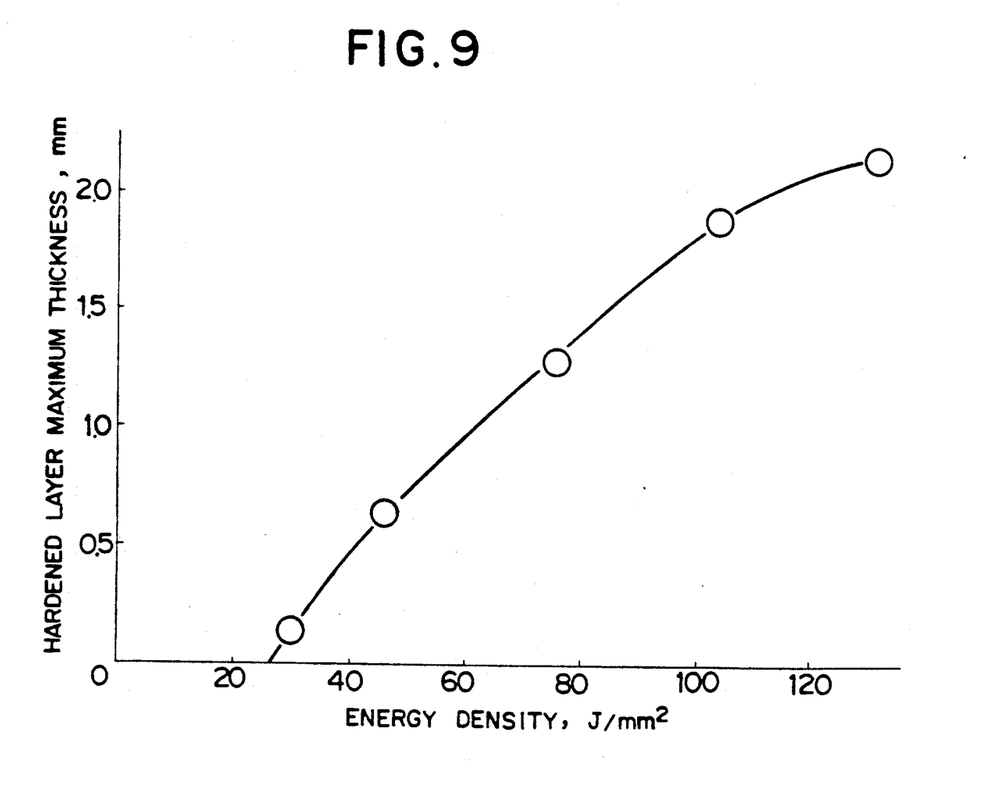
FIG. 9 is a graph showing the maximum thickness of a hardened layer as a function of energy density.

The relationship of the energy density or flux of a laser beam to the maximum thickness (t in FIG. 2) of a hardened layer was examined. The results are plotted in FIG. 9 wherein the abscissa represents the energy density of a laser beam in Joule/mm$^2$ and the ordinate represents the hardened layer maximum thickness in mm. As seen from FIG. 9, an energy density of 30 J/mm$^2$ to 110 J/mm$^2$ are desired to obtain a hardened layer having a maximum thickness of 0.05 mm to 2.0 mm. It is to be understood that the energy density I of a scanning laser beam is represented by the equation:

$$I = P/(a \times v)$$

wherein P is a laser output,
 a is a transverse distance of the laser beam having a rectangular section, and
 v is the scanning speed of the laser beam.

Figure 10:
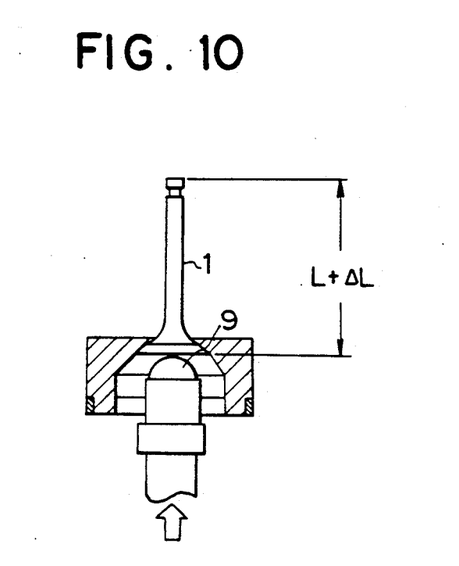
FIG. 10 is a schematic view illustrating a test for examining the deformation of a buildup valve.
Figure 11:
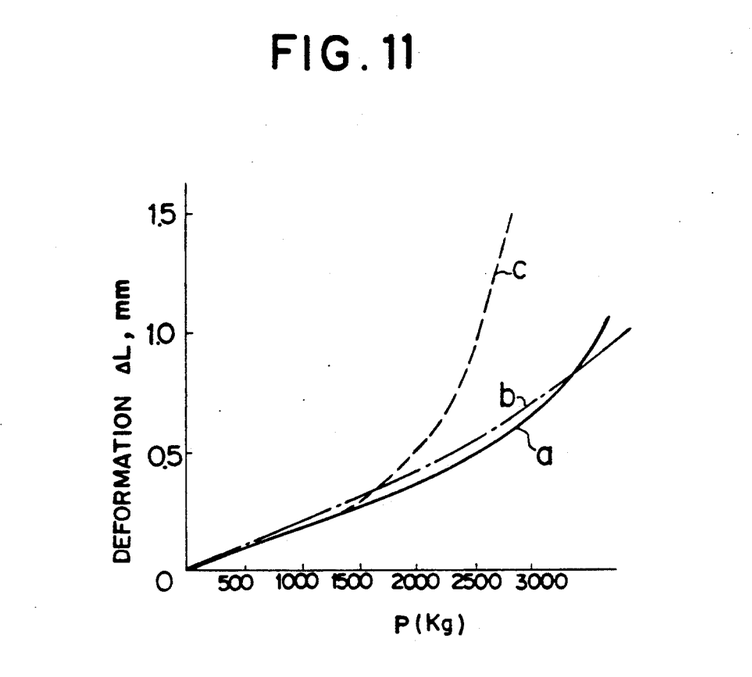
FIG. 11 is a graph showing the deformation of a valve as a function of a load provided that the hardened layer maximum thickness is fixed.

Next, the deformation of a valve under a load was examined using (a) a buildup valve prepared by the abovementioned method and having a hardened layer with a maximum thickness of 0.8 mm and a buildup layer of 0.4 mm thick. As shown in FIG. 10, the test was carried out by forcing a ball 9 against the rear side center of the head of the buildup valve which rested on a suitable seat member. The valve having an original length L was deformed to a total length of (L+ΔL) after the application of a pressure. The force applied to the ball 9 was changed to examine the relationship of the deformation ΔL to the applied pressure. For comparison purposes, the same test was applied to (b) a conventional buildup valve having a buildup layer formed by acetylene gas welding (having been tempered) and (c) a buildup valve in which a buildup layer was formed by a laser beam, but a hardened layer was little formed (hardened layer of 0.01 mm thick). The results are plotted in FIG. 11 wherein curve a represents the deformation of the buildup valve (a) obtained by the present example, curve b represents the deformation of the conventional acetylene gas welded buildup valve (b), and curve c represents the deformation of the laser processed buildup valve (c) having little formed the hardened layer. As seen from FIG. 11, the buildup valves of the present example exhibit a deformation resistance comparable to that of the conventional valve.

Figure 12:
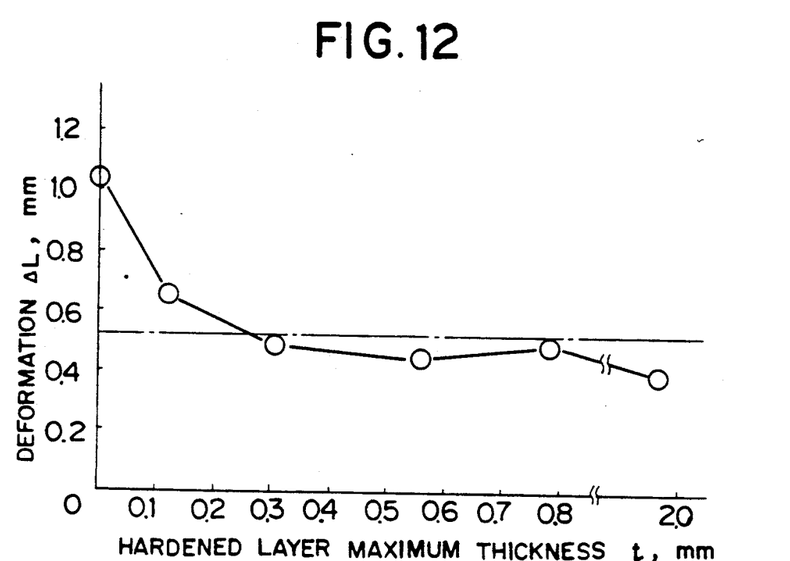
FIG. 12 is a graph showing the deformation of a valve as a function of hardened layer maximum thickness provided that the load is fixed.

In the similar test, the relationship of the deformation of a valve to the hardened layer maximum thickness was also examined while the load was fixed to 2500 kg. The hardened layer maximum thickness is as previously defined, that is, t in FIG. 2. The results are plotted in FIG. 12. It is seen that the buildup valves of the present example undergo a deformation comparable to or less than that of the conventional buildup valve (shown by dot-and-dash lines) when the hardened layer maximum thickness is 0.05 mm or more, particularly when the maximum thickness is 0.1 mm or more.

Figure 13:
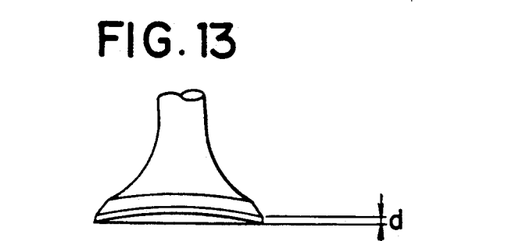
FIG. 13 is an elevation of a buildup valve illustrating the bowing of its valve face.
Figure 14:
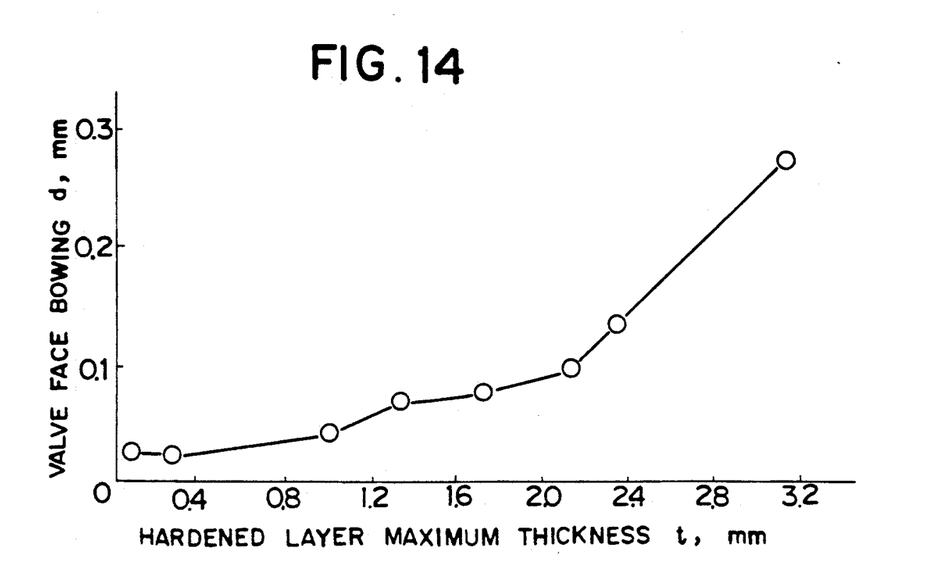
FIG. 14 is a graph showing the bowing of a valve face as a function of hardened layer maximum thickness.

Furthermore, the relationship of the hardened layer maximum thickness to the bowing of a buildup valve was examined. The term bowing is a warpage d of the circumferential edge of a valve face as shown in FIG. 13. The results are plotted in FIG. 14 wherein the abscissa represents the hardened layer maximum thickness t in mm and the ordinate represents the bowing d of the valve face in mm. As seen from FIG. 14, the buildup valve undergoes less bowing insofar as the hardened layer maximum thickness is up to 2.0 mm. This indicates that the present buildup valve is ready for use in the as-hardened state.

While there has been described what is at present considered to be the preferred embodiment of the invention, it will be understood that various modifications and changes may be made therein, and it is intended to cover in the appended claims all such modifications and changes as fall within the true spirit and scope of the invention.

In the buildup valve for use in internal combustion engines according to the present invention, a hardened layer of a specific thickness is formed inside a buildup layer to increase deformation resistance. The thickness of the buildup layer can be reduced to about ½ to 1/10 of that required in conventional buildup valves so that the amount of buildup material deposited is substantially reduced and thus a substantial saving is expected in the overall cost. Since the hardened layer characteristic of the invention is sufficiently thin to minimize valve deformation, the present buildup valve can be used in the as-hardened state without an additional tempering.

What is claimed is:

1. A method for producing a buildup valve for use in internal combustion engines comprising a valve body of a quench-hardenable, heat-resistant martensite steel having a valve face and a buildup layer formed on the valve face from a solid solution strengthening and dispersion strengthening cobalt or nickel base superalloy having higher wear and heat resistances than the heat resistant steel, the method comprising the steps of
supplying a powder of the alloy on the valve face of said valve body, and
applying a scanning high flux energy having a density of energy in the range between 30 J/mm$^2$ and 110 J/mm$^2$ to the powder deposit to cuase the powder to quickly melt and then quickly solidify thereby forming a buildup layer having thickness in the range between 0.1 mm and 0.5 mm and at the same time to cause a surface layer of the valve body underlying the powder deposit to quickly heat and then quickly cool thereby forming a hardened layer having a maximum thickness in the range between 0.05 mm and 2.0 mm and a Vickers hardness of 500 to 600.

2. The method of claim 1 wherein said high flux energy is in the form of a laser or plasma.

3. The method of claim 1, wherein siad powder of the alloy is an alloy of:
a) 1.0% C, 1.2 Si, less than 3.0% Ni, 28.0% Cr. 4% W, less than 3.0% Fe, balance Co,
b) 2.5% C, 1.1% Si, 1.5% Ni, 30.0% Cr, 0.6% Mo, 4-12.0% W, less than 1.5% Fe, balance Co, or
c) 0.25% C, 1.1% Si, 22.0% Ni, 26.0% Cr, 0.2% B, less than 1.5% Fe, balance Co.

* * * * *